April 20, 1926.  C. W. PETTIGREW  1,581,596
SUPPLEMENTAL SEAT FOR AUTOMOBILES AND THE LIKE
Filed Oct. 3, 1925
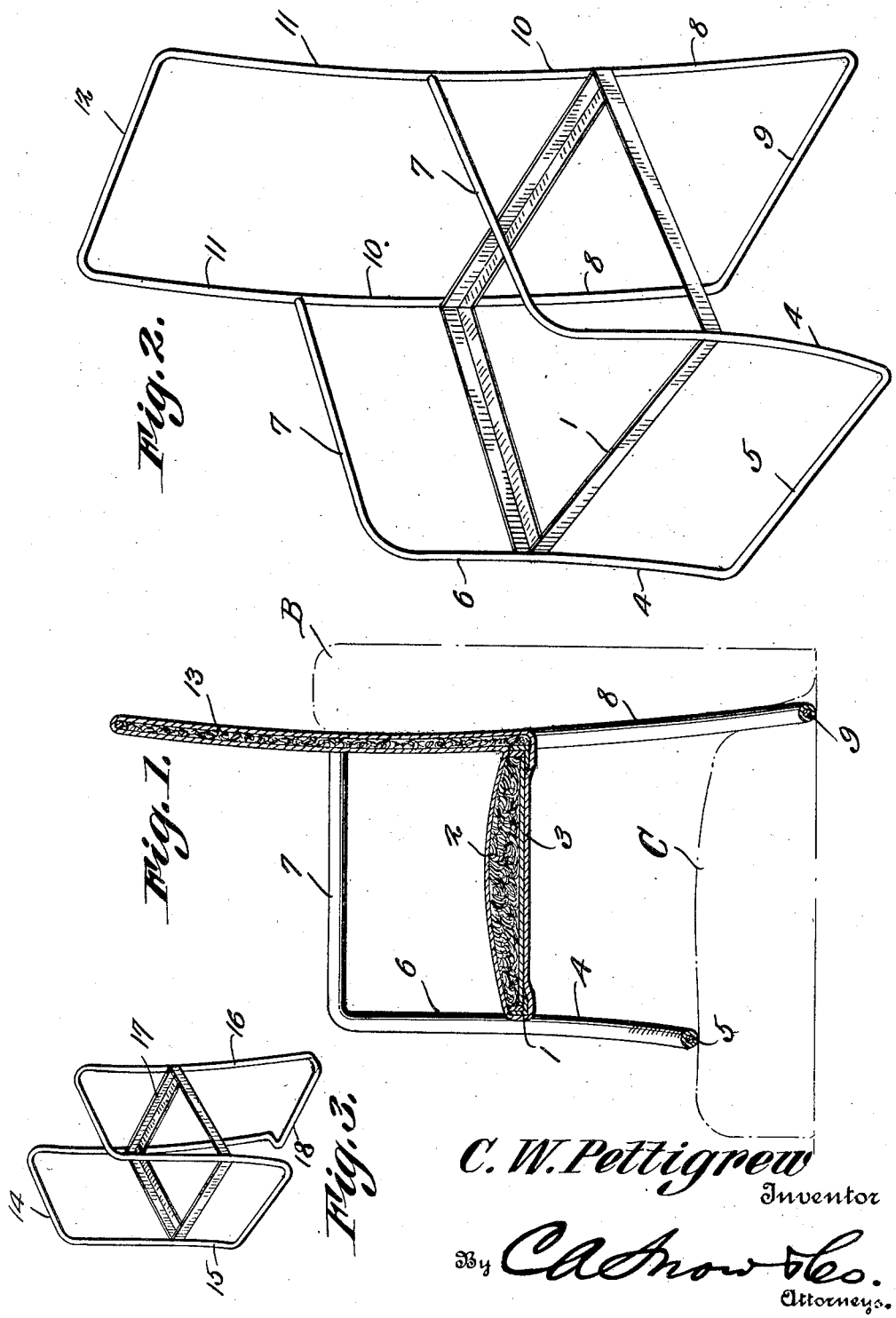

Patented Apr. 20, 1926.

1,581,596

UNITED STATES PATENT OFFICE.

CHARLES W. PETTIGREW, OF PARKERSBURG, WEST VIRGINIA.

SUPPLEMENTAL SEAT FOR AUTOMOBILES AND THE LIKE.

Application filed October 3, 1925. Serial No. 60,276.

*To all whom it may concern:*

Be it known that I, CHARLES W. PETTIGREW, a citizen of the United States, residing at Parkersburg, in the county of Wood and State of West Virginia, have invented a new and useful Supplemental Seat for Automobiles and the like, of which the following is specification.

This invention relates to a supplemental seat or chair designed primarily for use in connection with automobiles and other vehicles, one of the objects of the invention being to provide a light, durable and efficient chair for use by children and which can be set up readily upon the seat of an automobile where it will be held securely without the use of any special fastening means and support a child where it can see readily through the windows.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a vertical section through the seat or chair in position on an automobile seat.

Figure 2 is a perspective view of the frame of the chair.

Figure 3 is a perspective view on a reduced scale of a slightly modified form of supplemental chair.

Referring to the figures by characters of reference 1 designates the frame of the chair which is preferably formed of angle iron so as to receive and support the cushion 2 and its frame 3 constituting the seat of the chair.

To the front corner portions of the frame 1 are welded or otherwise connected legs 4 preferably in the form of metal rods. These legs can be connected at their lower ends by an integral cross rod 5 and they are preferably extended above the frame as shown at 6 where they merge into handle portions 7 extended rearwardly. The rear legs 8 are also perferably formed of rods welded or otherwise attached to the rear corner portions of the frame 1, these rear legs being connected at their lower ends by an integral cross rod 9. Said legs are extended upwardly as shown at 10 and meet the handle portions 7. If desired the legs 10 can be extended above the handle portions as shown at 11, their upper ends being connected by a cross rod 12 which is integral therewith. This rod 12 and the upstanding portions of the legs above the frame 1 cooperate to constitute a frame on which a back cushion 13 can be mounted. The rear legs 8 are longer than the front legs 4 and in use these legs 8 are inserted between the rear of the seat cushion C of an automobile and a back cushion B so as to rest upon the board beneath the seat cushion. When the rear legs are thus located the front legs 4 and the connecting rod 5 bear upon the front portion of the cushion C as shown in Figure 1. Obviously in this way the auxiliary or supplemental seat is held securely in position relative to the automobile seat without requiring the use of any special fastening means. It also serves to support a child at an elevation where it is possible to look out of a window easily.

Instead of having the rear legs extended upwardly to form a frame for a back cushion as shown in Figures 1 and 2 said rear legs can merge into handle portions 14 as shown in Figure 1. With this arrangement the back cushion B of an automobile seat constitutes the back cushion of the supplemental chair as will be obvious. In the modified structure shown in Figure 3 the front legs have been indicated at 15, the rear legs at 16, and the seat frame at 17. In this form as well as the form shown in Figures 1 and 2 the rear legs can be turned forwardly at their lower ends as shown at 18 so as to project under the rear portion of the cushion and thus firmly anchor the chair when properly positioned.

What is claimed is:

1. The combination with the seat and back cushions of an automobile seat, of a supplemental chair including a seat, a back leg extending back of the seat cushion of the automobile seat and in front of the back cushion thereof, and a front leg resting upon the seat cushion of the automobile seat, said cushions of the automobile seat cooperating with the back leg of the supplemental chair to hold said chair against displacement.

2. The combination with the seat and back cushions of an automobile seat, of a supplemental chair including a seat frame, back legs and front legs connected thereto, the back legs being longer than the front legs and extended between and retained by the cushions of the automobile seat, the front legs being mounted on the seat cushion of the automobile seat.

3. The combination with the seat and back cushions of an automobile seat, of a supplemental chair including a seat frame, back legs and front legs connected thereto, the back legs being longer than the front legs and extended between and retained by the cushions of the automobile seat, the front legs being mounted on the seat cushion of the automobile seat, and cross rods connecting the front legs at the lower ends thereof and the rear legs at the lower ends thereof.

In testimony that I claim the foregoing as my own, I have hereto affixed my signature.

CHARLES W. PETTIGREW.